March 9, 1971

T. O. PAINE  3,568,447
ADMINISTRATOR OF THE NATIONAL AERONAUTICS
AND SPACE ADMINISTRATION
FORCE-BALANCED, THROTTLE VALVE

Filed March 18, 1969

ROBERT W. RIEBLING
ALLAN R. MCDOUGAL
RICHARD N. PORTER
INVENTORS

ATTORNEYS

March 9, 1971

T. O. PAINE
ADMINISTRATOR OF THE NATIONAL AERONAUTICS
AND SPACE ADMINISTRATION
FORCE-BALANCED, THROTTLE VALVE 3,568,447

Filed March 18, 1969

ROBERT W. RIEBLING
ALLAN R. MC DOUGAL
RICHARD N. PORTER
INVENTORS

ATTORNEYS

United States Patent Office 3,568,447
Patented Mar. 9, 1971

3,568,447
FORCE-BALANCED, THROTTLE VALVE
T. O. Paine, Administrator of the National Aeronautics and Space Administration, in respect to an invention of Robert W. Riebling, La Canada, Allan R. McDougal, La Crescenta, and Richard N. Porter, Redondo Beach, Calif.
Filed Mar. 18, 1969, Ser. No. 808,192
Int. Cl. F02k 9/02; F16k 31/12
U.S. Cl. 60—243
14 Claims

ABSTRACT OF THE DISCLOSURE

A force-balanced, throttle valve adapted to respond to a fixed force for imposing selected changes in the flow rates of a stream of fluid directed therethrough, being particularly suited for use in pressure systems, such as rocket motor fuel systems, wherein increasing flow rates serve to increase pressures within the system, and characterized by a throttle plug adapted to be linearly reciprocated to selected metering positions for establishing variable flow rates for fluid flowing through the valve; a pressure chamber including therein an actuator adapted to apply a variable force to the plug for urging the plug in a first direction with a first force, varied at a rate commensurate with concurrent changes in system pressures; and biasing means operatively associated with the throttle plug adapted to act in opposition to the first force for urging the plug in its opposite direction with a variable second force equal to the first force so that a continuous force-balance is achieved between the opposing forces acting on the plug.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

(1) Field of the invention

The invention relates to throttle valves for establishing variable flow rates within a pressurized fluid system, and more particularly to a force-balanced, throttle valve for fuel systems, wherein opposing forces acting on a metering device within the valve are varied at a common rate, as the flow rate of fuel delivered through the valve is varied in response to selective changes in settings of the metering device.

(2) Description of the prior art

The prior art is replete with fluid metering valves operatively controlled by various means, such as electrically driven solenoids, springs, levers, pressure diaphragms and the like, which function for initiating changes in flow rates for streams of fluids flowing therethrough. In most instances, the rate of response for such valves, in varying the flow rate of fluid flowing therethrough, is not deemed to be critical. Therefore, lag in response to actuation of the control mechanism can be tolerated to varying degrees. However, where a valve is to be employed in a high-pressure fuel supply system, such as is commonly provided for use with liquid propellant rocket motors, absolute shut-off and accurate control of valve flow rates is, for reasons which are readily apparent, of the utmost importance. Therefore, throttle valves employed in rocket motor fuel systems must be adapted for quick response, under relatively high system pressures, for achieving suitable valve control and convenient variations in fuel flow as the fuel is supplied to the motors.

In certain instances, it has been the practice to provide solenoid driven and spring loaded mechanisms, employing relatively heavy springs to provide the required positive shut-off and rapid response for operatively displacing fuel metering devices. Where heavy springs have been employed in actuating fuel metering devices relatively large power requirements for the system have been needed for overcoming either the forces of the springs or, conversely, the pressures of the systems.

Furthermore, valves employed in rocket motors preferably minimize fluid entrapment between the operative valve components and the liquid motor since, ideally, there should be no delay in delivering fuel to the motor, subsequent to an opening of the valve and once the valve is closed achieving immediate termination of fuel delivery. Furthermore, valves heretofore employed in supplying fuel to rocket motors frequently are of designs which include fuel retaining volumes or repositories which require, upon an opening of the valve, that the volumes be filled before fuel can be delivered to the rocket motors and upon the closing require that the repository be drained through a continued discharge or "dribble." The resultant lag in response precludes the attainment of desired precision of control and instantaneous reaction. Furthermore, existing valves include numerous seals which are not totally reliable for spacecraft operations of extended durations, since deterioration of the seals frequently results from high pressures encountered, foreign matter present within the fuel system, and "aging" due to the deleterious effects of the thermal conditions and fuel compositions acting thereon.

OBJECTS AND SUMMARY OF THE INVENTION

This invention overcomes the aforementioned difficulties through the use of a force-balanced, throttle valve, wherein forces developed within a combustion chamber, the level of which is dictated by the rate of flow for a stream of fuel delivered through the valve, is employed in cooperation with equal and opposing forces, applied by a resilient means, to accommodate valve control through an application of a relatively small and constant force employed to provide a desired "setting" throughout a range of valve settings and wherein an improved disk having a segmented continuous surface is provided and utilized in achieving rapid response without introducing seal leakage and, in instances where the valve is employed in a space environment, without encountering cold-welding of the valve components.

Accordingly, an object of the instant invention is to provide a simplified force-balanced, throttle valve.

Another object is to provide an improved, economic and highly reliable valve particularly adapted for use as a fuel control valve in fuel systems.

Another object is to provide a simplified, economic and highly reliable force-balanced, throttle valve particularly suited for use as a fuel flow control valve to be employed within liquid fuel systems of rocket motors.

Another object is to provide a fluid metering valve which utilizes a balancing of valve control forces, established in response to variations in flow rate settings for the valve, for thereby reducing the force required in achieving variations in valve settings.

Another object is to provide an improved, simplified and economic force-balanced, throttle liquid fuel valve particularly adapted for achieving control over thrust transient for a liquid fuel rocket motor by providing for a reduction of fuel repositories between the valve and the motor, while concurrently increasing the sealing efficiency of the valve.

Another object is to provide in a fuel control valve an improved metering member having a permeation barrier characteristic of a metal-to-metal seal, while being adapted to accommodate existing irregularity in the surfaces of valve seats and foreign matter deposited thereon for thereby enhancing the effectiveness of the valve.

Another object is to provide a fail safe valve that will, in the event of rocket chamber failure, shut off instantly.

DESCRIPTION OF THE PREFERRED EMBODIMENT

Figure 1:
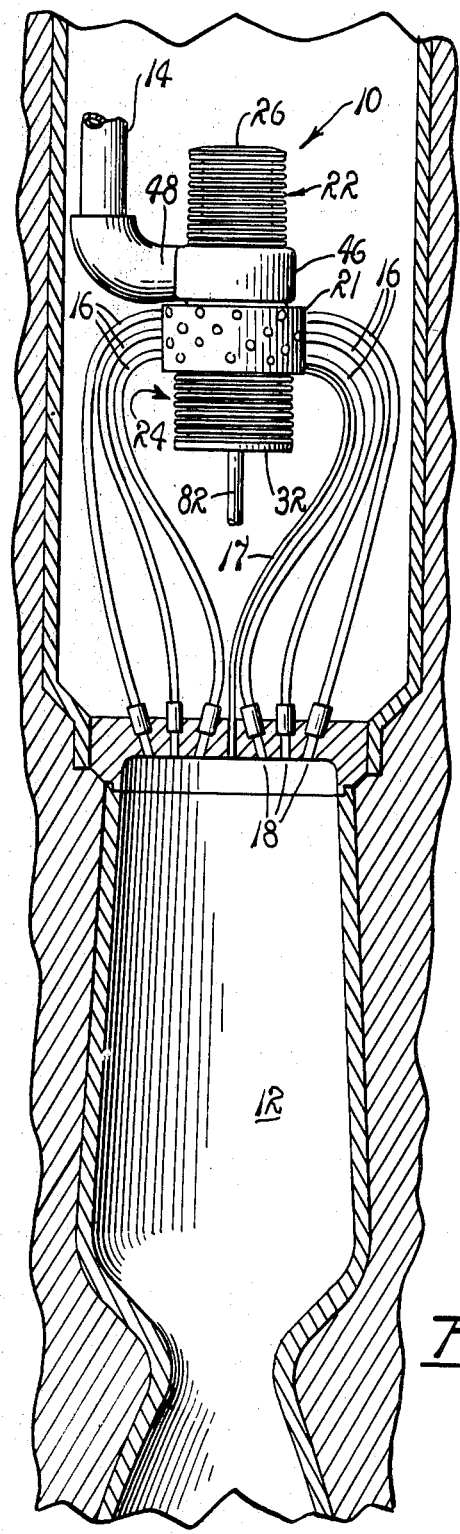
FIG. 1 is a partial cross sectional elevation of a rocket motor, illustrating a typical environment for the valve embodying the principles of the present invention.

Turning to FIG. 1, therein is illustrated a valve 10 coupled with a combustion chamber 12 of an associated rocket motor, not designated. Fuel in its liquid state is delivered to the valve 10 through an input conduit 14, and from the valve through a plurality of fuel injector conduits 16 which serve to couple the valve 10 with the combustion chamber 12. The valve 10 also is coupled with the combustion chamber 12 through a tubular connector 17. The connector 17 and pressure conduit particularly are suited for delivering pressures developed within the combustion chamber back to the valve 10. As a practical matter, fuel delivery to the combustion chamber 12, is achieved through a plurality of fuel injector units 18, of a suitable design, operatively coupled with the distal ends of the fuel injector conduits 16, in a manner consistent with principles commonly employed in the design of liquid propellant motors.

It is to be understood that the valve 10 has utility in various systems wherein back pressure is developed in response to a flow of fluid directed through the valve, and that utilization of the valve is not limited to fuel systems for rocket motors. However, since the valve 10 has particular utility with rocket motors, and resulted from efforts to achieve improvements in fuel valves employed in controlling space craft motors, for purposes of describing the invention and illustrating its utility it will be assumed that valve 10 is connected within a fuel supply system for a liquid fuel rocket motor.

The valve 10 includes a valve housing, generally designated 20. The housing is provided with a rigid, central tubular portion 21, a first flexible tubular portion 22, including a tubular bellows 23 secured to a first end of the portion 21 in coaxial alignment therewith, and a second tubular portion 24, which also includes a tubular bellows, designated 25, secured at a second end of the central portion in coaxial alignment therewith.

One end of the housing portion 22 is sealed by a disk-like sealing cap 26 extended across the first end of the tubular bellows 23 and secured in sealing engagement therewith. The bellows, in turn, is secured at its second end to the central portion 21 through the use of a convenient coupling ring 28. The ring 28 is welded or otherwise secured to the bellows 23 and ultimately is welded to the housing 20 through a convenient welding operation.

The second flexible housing portion 24, likewise, is secured to the central portion 21 through a coupling ring 30, quite similar to the ring 28. The ring 30 is secured to the tubular bellows 25 and to the central housing 21 by any suitable means, such as by welding, for example, while the opposite end of the bellows 25 is secured to an annular sealing cap 32, also by a welding process, and is provided with an inwardly directed pressure face 34.

The central portion of the housing 21 is divided into three segments including an intake manifold 36, a discharge manifold 38 and a valve sealing section 40 arranged between the manifold. It is intended that a pressurized stream of fuel be directed into the valve 10 from the input 14, at the intake manifold, to be metered and discharged into the conduits 16 at the discharge manifold, subsequent to its passage through the valve sealing section 40.

The intake manifold 36 includes a tubular manifold conduit 42 circumscribing the housing portion 21. This conduit serves to deliver fluid to the housing 20 from a plurality of points arranged about the periphery of the housing portion 21 and is formed of an annular channel 44 machined into the external wall of the housing portion 21. The channel 44 is "capped" by an annular cap 46 welded or otherwise secured thereto. The manifold conduit also includes a suitable coupling 48 welded or otherwise secured about a convenient opening formed in the cap 46 for coupling the conduit with the input 14 for thereby establishing a path for the delivery of a stream of fuel to the conduit.

The channel 44 is provided with a multiplicity of circumferentially spaced ports 50, which serve as fuel input ports for the valve 10. The ports are formed to extend through the wall of the channel 44 so that as the stream of fuel is directed through the coupling 48 it is caused to be conducted by the conduit 42 in an annular path about the housing and discharged radially into the valve. In practice, the ports 50 are diagonally inclined to extend from the conduit 42 to the internal portions of the valve housing 20, adjacent the flexible portion 22 thereof.

The discharge manifold 38, on the other hand, serves to meter and discharge fuel from the valve housing 20, after the fuel has been conducted through the valve sealing section 40 of the valve housing. In practice, this discharge is achieved by directing the fuel from the valve through selected injector conduits 16 coupled thereto to extend from the valve housing 20 to the injectors 18 of the combustion chamber 12.

In order to achieve a metered discharge of fluid from the valve, the discharge manifold 38 is provided with an annular metering sleeve 52. The sleeve is machined for a metal-to-metal fit and is inserted within the housing 20, between the sealing section 40 and the tubular portion 24. As a practical matter, the central portion 21 of the housing is provided with convenient key slots, not shown, for receiving therein suitable keys formed on the external surface of the metering sleeve in order to assure proper alignment is achieved as the sleeve is inserted into the housing.

The wall of metering sleeve 52 is provided with a multiplicity of spirally aligned metering ports 54, so arranged that the ports are few in number near the end portion thereof adjacent the sealing section 40, and are increased in number as the spirals progress towards the opposite end of the sleeve. Hence, few ports 54 are provided at the first end portion of the metering sleeve, while the portion of the metering sleeve adjacent the opposite end thereof includes a relatively large number of such ports for accommodating a desired metering control for fuel delivered therethrough.

Also, to assist in achieving metering control for the valve the ports themselves are of a generally rectangular configuration as they communicate with the internal surfaces of the sleeve 52, but develop into circular openings as they communicate with the external surface of the sleeve. At the internal surfaces of the sleeve the ports are so dimensioned as to provide the sleeve with a multiplicity of slotted openings, whereby a maximum cross section area at each port extends in a circumferential direction so that fine metering control for the fuel may be achieved as the fuel is delivered from the discharge manifold 38 to the conduits 16.

Arranged in coaxial alignment with the metering ports 54 there is provided a multiplicity of discharge ports 56 extending through the walls of the valve housing 20. These ports, in turn, communicate with coaxially aligned ports 58 formed within a circumscribing coupling ring 60. The ring 60 serves as a convenient coupling for establishing a union between the injector conduits 16 and the discharge ports 56 of the discharge manifold 38. In practice, the ring 60 is positioned about the housing and welded in place with the ends of the conduits 16 being inserted into enlarged openings formed within the ring in coaxial alignment with the ports 54 and 58. The ends of the conduits 16 are soldered or otherwise secured to the ring in communication with the ports 52. Since the ring 60 is employed only as a convenient mechanism for joining the conduits 16 with the valve housing 20, it is to be understood that any convenient coupling device may be employed in lieu of the ring.

Figure 4:
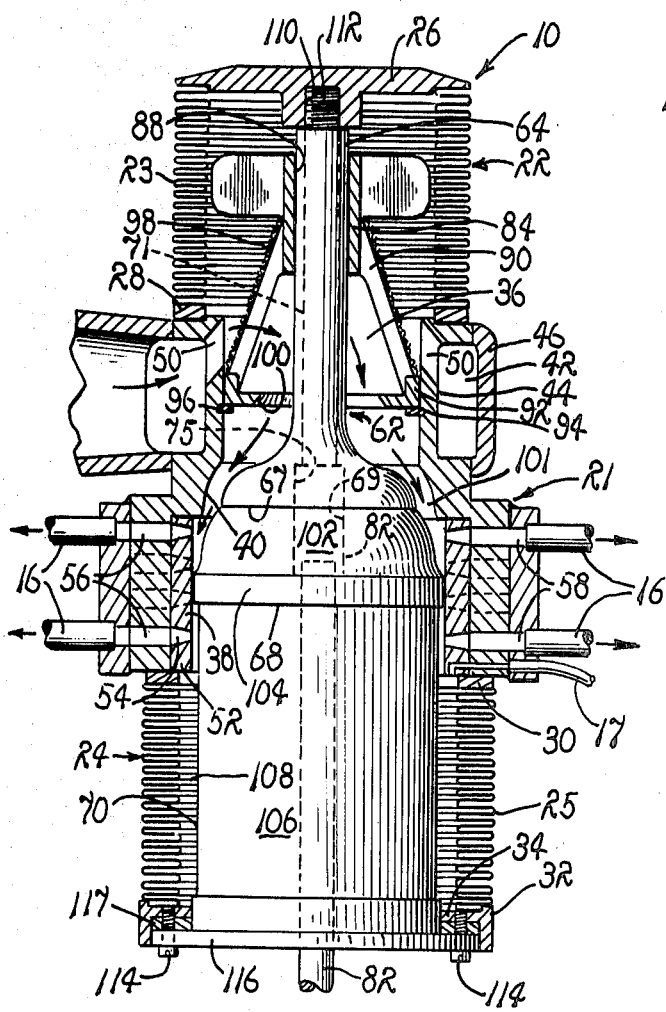
FIG. 4 is a cross sectional view of the valve, similar to the view of FIG. 2, illustrating the interrelationship of the valve's components when the components are positioned for a selected valve setting.
Figure 3:
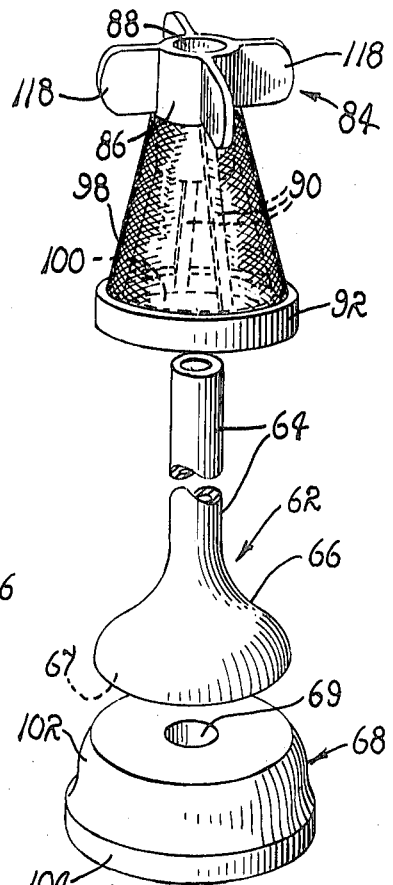
FIG. 3 is a partially exploded perspective view illustrating the interrelationship of selected components of the valve shown in FIGS. 1 and 2.

In order to establish the desired "on-off" and metering function for controlling the flow of fuel directed through the valve housing 20, a throttle plug 62, better illustrated in FIGS. 3 and 4, is mounted for rectilinear reciprocation within the housing 20. The throttle plug includes a stem 64 having a bell-shaped disk-supporting receptacle 66 formed at one end thereof for receiving and mounting a circular sealing disk 68. In practice, the receptacle 66 includes a planar transverse surface 67 which is mated with a planar surface of the sealing disk 68, whereby a sealing engagement is established between the planar surfaces of the receptacle and the sealing disk as the disk is supported thereon. Preferably, the stem 64 is a tubular member having an axial bore extended therethrough. The disk 68 includes an annular outer longitudinally tapered surface, not designated, and an axial opening 69 adapted to be coaxially aligned with the bore of the stem 64.

A spindle 70 having formed thereon an elongated stem 71 is extended through the opening 69 and into the bore of the tubular member 66. The spindle further includes an annular shoulder 72 which is seated against the sealing disk 68. The spindle further includes a disk-shaped end member 73 having an external transverse planar surface 74, adjacent the shoulder, adapted to be received and seated within a recess conveniently formed in the adjacent surface of the sealing disk, opposite the receptacle 66, while the shoulder 72 includes an annular surface 76 adapted to mate with a peripheral planar surface of the disk, as better illustrated in FIG. 3.

In order to complete the coupling of the sealing disk 68 with the receptacle 66, the receptacle is provided with a screw-threaded opening 75 having formed therein internal screw threads 76 which mate with screw threads 77 circumscribing the stem 71 for uniting the stems 64 and 71 into a unitary member, with the disk 68 being disposed between the spindle and the receptacle. A screw-threaded opening 80 is formed in the end member 73 internally of the spindle 70, into which there is extended a coupling rod 82, having a screw-threaded tip 83. The tip 83 is threadingly received within the threaded opening 80, FIG. 2.

The coupling rod 82 also serves as a push-pull linkage for slidingly adjusting the position throttle plug 62 for thereby positioning the disk 68 relative to the valve sealing section 40 and the metering parts 54 of the metering sleeve 52. The rod 82 is coupled within any suitable drive train, not shown, which responds to a given signal for applying a force in axial directions to the rod. Since the rod actuator forms no part of the invention, a detailed description is omitted.

In order to maintain the desired alignment for the throttle plug 62, as it is reciprocated within the housing 20 of the valve 10, a stem guide 84, including a tubular segment 86, is provided for slidingly receiving therein the stem 64. The segment 86 includes an axially aligned bore 88 having an internal diameter approximating the external diameter of the stem 64, whereby a sliding fit is achieved therebetween.

The tubular segment 86 of the stem guide 84 is supported by a circumscribing plurality of angular supports 90 extending diagonally from the tubular segment of an annular base 92. The spacing between the tubular segment and the annular base is a matter of convenience. However, it is to be understood that the base 92 operatively is seated within the bore of the central housing portion 21 and serves to retain the segment in concentric alignment within the valve housing 20 for thereby supporting the throttle plug 62 for reciprocation within the housing as the throttle plug operatively is displaced in response to a driving force applied thereto through the rod 82.

As should readily be apparent, the stream of fuel from the intake manifold 36 to the discharge manifold 38 is intercepted by the stem guide 84. Therefore, filtering of the fuel may be achieved by providing a convenient screen 98 about the supports 90, whereby the screen is caused operatively to be supported in the path of the stream as it progresses through the housing 20. Furthermore, it is to be noted that the stem guide 84 includes an opening 100 circumscribed by the annular base 92. This opening serves as a trimming orifice to adjust the over-all drop in valve pressures as the stream is directed therethrough.

As better illustrated in FIG. 4, the fluid passes from the orifice 100 to the discharge manifold 38 through an annular valve sealing seat 101 internally mcahined withing the valve sealing section 40. This seat provides a surface suitable for receiving a sealing surface 102 formed along the outer surface of the sealing disk 68.

The outer surface of the disk 68 is divided into two mutually spaced sealing surface segments, including the sealing surface 102, which is of a generally tapered configuration adapted to mate with the surface of the seat 101 for prohibiting the flow of fluid between the intake and discharge manifolds, and a cylindrical sealing segment 104, which serves as the metering surface for controlling the rate of flow through the ports 54 of the metering sleeve 52.

It is to be particularly noted that when the valve 20 is closed to fuel flow, the surface 102 of the disk 68 is seated in a fluid sealing engagement with the seat 101 to prevent a flow of fuel therebetween. However, when the valve is "cracked" the fuel is directed through the port 100 to the discharge manifold 38. Also, it is important to note that the surface 102 is not directly employed in a metering capacity, as a flow of fluid is directed to the metering sleeve 52 and that metering of the fluid is performed by the cylindrical segment 104, which is not directly employed in sealing the valve against the flow of fuel through the sealing section 40. By providing the disk 68 with a continuous surface having separate segments 102 and 104 for performing separate functions, it is possible to minimize the stream's path through the valve and, consequently, minimize volume existing between the valve's sealing surfaces and the valve's metering ports so that there are no voids to be filled upon the opening of the valve and acquiring a discharge from the manifold 38. Conversely, there are no large voids to be drained upon the closing of the valve, whereby fuel "dribble" readily is avoided. Furthermore, by employing separate surface segments for performing the valve sealing and valve metering functions, the potentially difficult problem of obtaining an adequate sealing engagement between surface segment 102 and the seat 101 of the throttle plug 62, imposed by an abrading effect of the orfices 64, readily is obviated.

The material from which the disk 68 is formed is a metallic foil and a tetrafluoroethylene, or Teflon, lamination. The use of a thus laminated material provides a degree of compliance not found in ordinary metal-to-metal sealing materials, in that irregularities in the mated sealing surfaces, as well as particles of fuel contamination deposited therebetween are accommodated so that potential leakage between the surfaces effectively is obviated. It has been found that Teflon has an inherent resilience which permits the surface segments of the disk to conform to the metal surfaces of the valve to the extent necessary to achieve the desired seal, while the metal layers establish a permeation barrier which is a characteristic of metal-to-metal sealing materials. While various combinations of Teflon and metal foils may be employed, 20 to 50 lamina, each being between .002 and .005 of an inch thick satisfactorily has been employed for establishing a redundancy sufficient to avoid permeation, while continuing to accommodate irregularities in the sealing surfaces.

Figure 2:
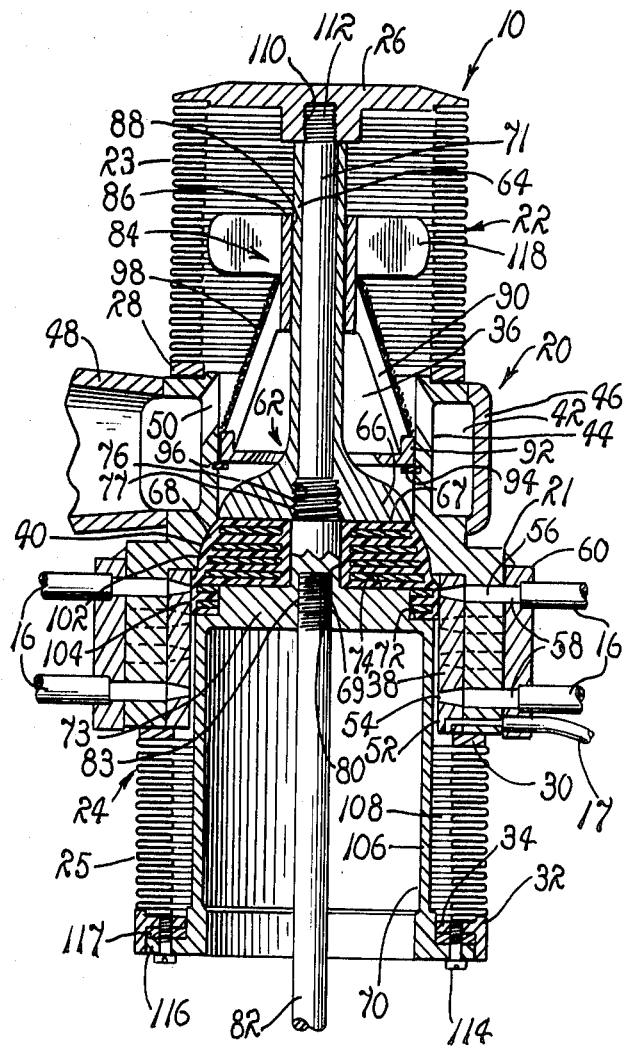
FIG. 2 is a cross sectional view of the valve shown in FIG. 1.

The spindle 70 also includes cylindrical side wall 106, FIG. 2, which is displaced radially and inwardly from the inner surfaces of the housing portion 24 of the housing 20. This spacing serves to define a pressure chamber 108 between the adjacent walls. The thus formed pressure chamber is sealed at the valve's outermost end by the annular sealing cap 32 seated in sealing engagement with the cylindrical wall of the spindle and at the innermost end by the disk 68. Therefore, it is to be understood that the pressure chamber 108 is an expandable chamber defined between the wall of the spindle 70 and the internal surfaces of the valve housing 20, including the internal surfaces of the bellows 25 as well as the internal surfaces of the metering sleeve 52, and is sealed at its opposing ends by the disk 68 and the pressure face 34 of the ring 32.

The chamber 108 is in direct communication with the combustion chamber 12 of the rocket motor via pressure connector 17. The injector conduits 16 also are in communication with the combustion chamber, of the rocket motor 12, hence, the chamber 108 also is in direct communication with the combustion chamber through the ports 54 of the metering sleeve 52 when the valve 10 is metering at less than a maximum flow rate. Therefore, pressures developed within the combustion chamber of the motor always are transmitted to the pressure chamber 108 via the ports 54 and the connector 17 in a manner such that the rates at which pressures are caused to vary within the chamber 108 are directly proportional to the rate at which the pressures are varied within the combustion chamber, even when the valve is fully opened to meter at a maximum flow rate.

Likewise, the rate at which pressures are varied within the combustion chamber is directly related to the flow rate established for the stream of liquid fuel delivered through the injector conduits 16, and this flow rate is, in turn, determined by the selected position of throttle plug 62 and the corresponding position of the surface 104 relative to the plurality of ports 54 of the metering sleeve 52. Therefore, as the plug 62 is selectively displaced, the surface 104 of the disk 68 is displaced so that the number of fuel conduits 16 permitted to conduct fuel is varied. As the number of fuel conducting conduits is varied, pressures within the combustion chamber are varied, whereby pressures established within the pressure chamber 108 are varied. Hence for any given instant, the pressure developed within the pressure chamber 108 is a pressure value directly dependent upon the number of ports 54 opened, as a consequence of a displacement of the surface segment 104 of the sealing disk 68 through a selective setting for the plug 62. In practice, the dimensions for the pressure chamber 108 are dictated by the size and number of ports 54, the pressure at which fuel is directed through the intake manifold 36, and the type of fuel employed, and accordingly can be varied as required.

As the disk 68 operatively is positioned by the coupling rod 82, it is apparent the means must be provided for applying forces in opposition to the forces developed by the pressures of the chamber 108. This is achieved simply by providing the bellows 23 and 25 with spring constants such that the combined spring rates thereof apply a combined force, which is equal and opposite to the forces of pressure developed within the chamber 108, as the throttle plug 62 is displaced to a desired setting for dictating flow rates through the valve housing.

To achieve the desired interrelationship between the bellows 23 and 25 and the throttle plug 62, the bellows are formed of a suitable metal, such as AM 350 stainless steel, which, after being fabricated into a bellows configuration, is heat treated to impart the required spring constant thereto. Since it is intended that the spring rates of the bellows 23 and 25 be employed to act against the pressures developed within the pressure chamber 108, the portion 22 of the housing 20 is assembled in a manner such as to employ the spring rate of the bellows 23 in compression, while the portion 24 of the housing 20 is assembled in a manner such as to utilize the forces of tension for the bellows 25.

The bellows 23 is coupled to the sealing disk 68 through a screw-threaded tubular coupling 110 formed in the internal surfaces of the cap 26 and arranged in coaxial alignment with the stem 64. The stem 71 also includes an extended screw-threaded tip 112 threadingly coupled with the cap 26 at the coupling 110. Hence, as the bellows 23 tends to elongate and apply to the cap an upwardly directed force, due to its spring constant, the force is applied to the stem, and consequently to the associated sealing disk 68 of the throttle plug 62.

In order that the bellows 25 be utilized to apply a force to the sealing disk 68, the ring 32 is secured by a plurality of screw-threaded studs 114, extended through an outwardly extended lip 116 of the spindle 70. A crush washer 117 is employed between the lip 116 and the plate 32 for sealing the chamber 108. This seal is the only seal required in the assembly of the valve housing 20. It is to be understood that as the bellows 25 acts to apply a retracting force to the ring 32, the spindle 70 is retracted for applying a driving force to the sealing disk 68, whereby the surface 104 is urged in displacement relative to the internal surfaces of the metering sleeve 52, and the surface 102 is urged toward a sealing engagement with the seat 101 of the housing's sealing section 40.

While not mandatory, it has been found practical to provide a supporting guide for the bellows 23. The guide, as presently employed, includes a plurality of radially extending protrusions 118 which engage the innermost surfaces of the bellows to preclude a misalignment thereof relative to the longitudinal axis of the valve housing.

Since it is intended that the forces of the bellows act to balance the valve against the forces developed within the pressure chamber 108, it is intended that the spring constants for the bellows 23 and 25 be such as always to react to provide forces equal and opposite to the forces acting on the throttle plug as a consequence of the pressures developed within the chamber 108. The particular spring constant required readily may be determined, since the pressure developed within the combustion chamber is a determinable value for each "setting" of the throttle plug 62 and the combined force to be applied by the bellows 23 and 25 for each "setting" of the plug 62 is a force which is equal to the force developed within the pressure chamber and acting on the throttle plug 62. Therefore, for every setting of the throttle plug 62, the forces within the chamber 108 and the forces applied by the bellows may be a known value and are caused to act upon the throttle plug 62 in opposing directions, whereby a static flow rate condition is imparted to the valve as displacement of the plug is precluded through a balancing of opposing forces acting thereon. The sealing surface 102 has a pressure transmitting surface area equal to the pressure transmitting surface area of the bellows 22. Hence, the axial forces resulting from system fuel pressures acting on the throttle plug 62 are nullified.

In practice, it has been found desirable to assemble the valve 10 with a preselected preload force against which the pressure delivered to the chamber 108 is permitted to act. However, when the valve 10 is fully closed, so that the surface 102 is mated with the surface of the seat 101, the pressure within the chamber 108 has "leaked" through the combustion chamber. Hence, there is no pressure within the combustion chamber for acting in opposition to the bellows 23 and 25.

Since the valve 10 is connected within an operative fuel system, the pressure of the system is applied to valve sealing cap 26 as fuel is delivered into the housing via the manifold 36. The effective pressure transmitting surface area of the receptacle 66 is less than the pressure transmitting area of the bellows 22, when the valve is closed, whereby the pressure of the fuel system exerts a net upward force for retaining the valve in a closed condition so that the surface 102 is seated against the seat 101. Hence, in order to "crack" the valve, preparatory to metering fuel therethrough, it is necessary that the forces of the system pressure, as well as the preload forces applied by the bellows, be overcome through an application of an operative force to the rod 82.

For example, assume that the net difference between the surface area of the receptacle portion of the stem 64 and the cap 26 equals .4 square inch and the pressure of the fuel system is 220 pounds per square inch, the force of the fuel system acting to close the valve is 88 pounds. If the combined preload force of the bellows 23 and 25 is selected at 28 pounds, the required force for unseating the surface segment 102, of the sealing disk 68, will be something greater than 116 pounds, since 116 pounds establishes a static condition for the throttle plug 62.

Once the valve 10 is "cracked" the effect of the pressure of the fuel system is rendered negligible, due in part to the fact that the tapered sealing surface 102 of the disk 68 is exposed to the fuel delivered into the housing. As fuel is delivered through the conduits 16, combustion within the combustion chamber 12 is achieved to thus generate therewithin pressure which is delivered to the chamber 108, through the conduit 17. The increasing forces applied by the bellows 23 and 25, as the throttle plug 62 is advanced thereagainst, are opposed by the increasing forces developed within the combustion chamber 12 and delivered to the chamber 108. Hence, a substantial balance of increasing forces continuously is achieved and maintained so that the forces applied to the coupling rod 82 in achieving a stabilized setting for the valve 10 remain at a substantially constant magnitude.

It is important here to understand that the force applied by the bellows 23 and 25, the force developed within the combustion chamber 12, and the preload force all are of a determinable magnitude for each setting of the valve 10. Therefore, in practice, the valve 10 is fabricated and assembled in a manner such that for each fuel metering setting of the valve, the force of the pressure developed within the combustion chamber 12 is equal and opposite to the sum of the forces applied by the bellows 23 and 25. This force, of course, includes the preload force. Consequently, the instantaneous force required in displacing the throttle plug 62 for achieving a valve setting substantially is a force of a magnitude sufficient for overcoming the inherent friction of the valve components, since once the valve is opened, a balance between the various forces acting on the plug 62 is achieved with negligible delay.

Figure 5:
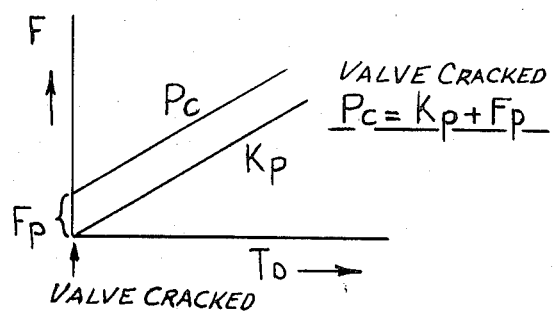
FIG. 5 is a force graph illustrating the interrelationship of the forces developed as the throttle plug of the valve is displaced for altering the flow rate of the valve as fuel is conducted therethrough to the combustion chamber of the motor of FIG. 1.

As depicted in FIG. 5, wherein is illustrated the relationship of the throttle displacement, designated TD, and the resulting force increase experienced as the throttle plug 62 is displaced, designated F, increased throttle plug displacement causes forces of pressure Pc delivered to the pressure chamber 108 to increase, due to an increase rate of combustion initiated within the combustion 12 of the rocket motor. The same displacement of the plug 62 serves to initiate an increase in reaction forces applied by the bellows 23 and 25, designated Kp, to increase at a rate consistent with that at which the pressure Pc is increased. The force Pc is of a magnitude equal to the reaction forces Kp, plus the preload force Fp.

For purposes of calculating the required forces, assume that for every inch of travel of the throttle plug 62, a known pressure increase of 266 pounds per square inch is experienced within a combustion chamber of the motor. Further, assume that the net area of the chamber 108 against which the pressure acts in opposition to the combined forces of the bellows 23 and 25 is .786 square inch. Hence, a resulting force of 209 pounds will be available for each inch of travel for the throttle plug so that the combined force of the spring rates of the bellows 23 and 25 must equal 209 pounds for each inch of travel of the throttle plug 62.

OPERATION

It is believed that in view of the foregoing description, the operation of the device will be readily understood and it will be briefly reviewed at this point.

Assuming that the valve 10 has been assembled in the manner heretofore described and connected within a convenient fuel supply system of a rocket motor, it may be assumed that fuel is delivered to the input 14, and consequently to the intake manifold 36. Assuming further that the sealing disk 68 is seated with respect to the surfaces of the seat 101, the pressures developed within the housing portion 22 of the housing 20 are directly related to the pressures of the fuel system as the fuel is delivered thereto through the intake manifold 36. In practice, the surface area of that portion of the stem 64, which serves as a receptacle 66 for receiving the sealing disk 68, is substantially less than the internal surfaces of the sealing cap 26 or the effective area of the bellows 22 at the cap 26. Hence, the net pressure of the fuel system directed against the cap 26 establishes the value of the forces applied by the fuel system for retaining the valve 10 in a closed condition. This force, added to the forces of preload imposed on the bellows 23 and 25, determines the force which must axially be applied to the rod 82 to effect an unseating of the surface segment 102 of the disk 68 from the surface of the seat 101.

Once the surface 102 is unseated, relative to the surface 101 within the sealing section 40 of the valve housing 20, the pressure of the fuel system is rendered negligible as the area of the sealing surface 102 of the plug 62 is presented to the fuel, and a pressure drop is experienced, due to the escape of fuel through thus uncovered ports 54 to the combustion chamber of the motor 12. At this instant, the number of ports 54 opened dictates the pressure which rapidly is developed within the combustion chamber 12 of the motor, and therefore delivered to the chamber 108, whereby a force acting in opposition to the combined force applied by the bellows 23 and 25 is established within the chamber 108 and applied to the sealing plug 62. Thus a static condition is imposed on the throttle plug 62 as the force which is developed as a consequence of the pressure delivered to the chamber 108 is rendered equal to the force applied by the bellows 23 and 25. Any change in valve settings may be achieved simply by a slight additional force to overcome the valve friction.

In the event pressure loss occurs within the combustion chamber, the force due to this pressure vanishes, whereupon the valve will close due to the spring pressure of the bellows.

In view of the foregoing, it should be readily apparent that the present invention provides a simplified and improved throttle valve which utilizes the pressure developed within a pressurized system for balancing the forces applied by a spring bias mechanism so that the valve may be retained in a closed condition under relatively high forces acting thereon while being adjusted to varying throttling positions, with a limited constant force, regardless of the level of pressure developed within the system.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

What is claimed is:

1. A force-balanced, throttle valve adapted to be employed as a fuel control valve for liquid propellant rocket motors and the like, comprising:
   (A) a valve housing including a first manifold means circumscribing said housing adapted to serve as a valve intake manifold;
   (B) a second manifold means circumscribing said housing including means defining a multiplicity of metering outlet ports adapted to serve as a valve output manifold;
   (C) a bore defining a conduit extending between the manifolds for establishing a flow of fuel therebetween including a valve seat circumscribing the bore;
   (D) a throttle plug adapted to be reciprocated axially within the bore having a first surface segment including a circular seal adapted to be mated with the surface of the valve seat for selectively opening and closing the conduit; and
   (E) selectively operable means for reciprocating said plug for thereby selectively opening and closing the conduit within said housing between the inlet and output manifolds.

2. A force-balanced, throttle valve adapted to be employed as a fuel control valve for liquid propellant rocket motors and the like, comprising:
   (A) a valve housing including a first manifold means circumscribing said housing adapted to serve as a valve intake manifold;
   (B) a second manifold means circumscribing said housing including means defining a multiplicity of metering outlet ports adapted to serve as a valve output manifold;
   (C) a bore defining a conduit extending between the manifolds for establishing a flow of fuel therebetween including a valve seat circumscribing the bore;
   (D) a throttle plug adapted to be reciprocated axially within the bore including a stem having a plug head formed of a multiplicity of layers of metallic foil and tetrafluoroethylene extending radially from the stem having a first surface segment including a circular seal adapted to be mated with the surface of the valve seat for selectively opening and closing the conduit; and
   (E) selectively operable means for reciprocating said plug for thereby selectively opening and closing the conduit within said housing between the inlet and output manifolds.

3. The combination of claim 2 further comprising:
   (A) a tubular guide seated within said housing and including means defining therein a bore for receiving and guiding the stem as the throttle plug is displaced; and
   (B) means including a mesh screen supported by the guide in a manner such that fluid introduced through the intake manifold is directed through said screen as it progresses from the intake to the output manifold, whereby fuel introduced into the housing is filtered prior to its being expelled therefrom.

4. The combination of claim 3 wherein said plug head includes a surface segment disposed in engagement with the internal surfaces of said housing adjacent said output manifold adapted selectively to sealingly close said outlet ports as the throttle plug is displaced therewithin, whereby metering of the fuel is achieved.

5. The combination of claim 4 further including a plurality of connectors singly connected to each of the outlet ports with an injector of the associated rocket motor.

6. The combination of claim 5 wherein the outlet ports of the manifold are aligned in a plurality of series of helical spirals so that throttling can be achieved at the output manifold by displacing the throttle plug for opening a fewer number of ports at lower thrust level, opening an increased number of ports at intermediate thrust levels, and by opening a maximum number of ports at the highest obtainable thrust level.

7. The combination of claim 6 wherein the valve housing includes a first tubular bellows including a transversely extended sealing cap for sealing said housing adjacent the plug guide, and a second tubular bellows oppositely disposed from said first bellows portion including a pressure ring defining within said housing a pressure chamber.

8. The combination of claim 7 wherein the first and second tubular bellows are formed of a resilient material such that the first bellows comprises an annular biasing member acting under compression to force said sealing cap outwardly from said housing and said second bellows comprises an annular biasing member acting under tension for forcing said ring in a retracting displacement relative to the valve housing.

9. The combination of claim 8 wherein there is included means for coupling the stem of the throttle plug with the sealing cap and the pressure ring with the sealing plug, so that the sealing plug is continuously biased by the bellows towards a valve closing disposition relative to said valve seat.

10. The combination of claim 9 further including pressure means within said pressure chamber adapted to respond to pressures developed within the pressure chamber for urging said sealing plug out of engagement with the valve seat as pressures are developed within the combustion chamber of said rocket motor.

11. The combination of claim 10 wherein as the throttle plug is reciprocated, the spring rates of the bellows develop forces acting in opposition to forces developed by the pressure of the pressure chamber variable at a rate commensurate therewith.

12. The combination of claim 11 wherein the forces developed by the bellows and the forces developed by the pressure are of equal value.

13. The combination of claim 12 wherein the valve housing is assembled in a manner such that a force preload of a predetermined value is applied to the throttle plug by said bellows.

14. The combination of claim 13 further including a constant force linkage connected with the throttle plug and adapted to apply to the plug a force equal and opposite to the forces of the preload, whereby a selected metering of the fuel may be achieved by maintaining the throttle plug in a static position.

References Cited

UNITED STATES PATENTS

| | | | |
|---|---|---|---|
| 2,496,710 | 2/1950 | Goddard | 60—243 |
| 2,939,278 | 6/1960 | Fox | 60—243 |
| 2,995,008 | 8/1961 | Fox | 60—240 |
| 3,170,286 | 2/1965 | Stein | 60—267 |
| 3,344,605 | 10/1967 | Mageean | 60—258 |
| 3,391,533 | 7/1968 | Mageean | 60—240 |
| 3,429,124 | 2/1969 | Bell | 60—258 |
| 3,433,022 | 3/1969 | Lovingham | 60—240 |

DOUGLAS HART, Primary Examiner

U.S. Cl. X.R.

60—258; 137—494